Patented Sept. 26, 1950

2,523,470

UNITED STATES PATENT OFFICE 2,523,470

REACTION PRODUCTS OF AN ALDEHYDE AND AN AMIDE OF PERFLUORODICARBOXYLIC ACID

Edward L. Kropa, Old Greenwich, and John J. Padbury, Stamford, Conn., assignors to American Cyanamid Company, New York, N. Y., a corporation of Maine No Drawing. Application February 27, 1947, Serial No. 731,423

22 Claims. (Cl. 252—8.1)

This invention relates to the production of new synthetic materials and more particularly to new resinous and other compositions which are especially suitable for use in, for example, the plastics, coating and textile-finishing arts. The invention specifically is concerned with compositions comprising a synthetic material which is the product of reaction of ingredients comprising (1) an aldehyde (including polymeric aldehydes, hydroxyaldehydes and aldehyde-addition products) and (2) an amide of a saturated aliphatic perfluorodicarboxylic acid, which amide has at least one hydrogen atom attached to an amide nitrogen atom thereof; and with methods of preparing such compositions.

The class of amides which are used in carrying the present invention into effect embraces those which may be represented by the general formula I
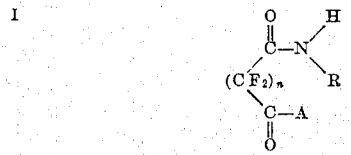

where R represents a member of the class consisting of hydrogen and monovalent hydrocarbon radicals, A represents one of the following: OR',

where R' has the same meaning as R, and $n$ represents an integer which is at least 1, that is, $n$ is a positive integer. Thus, when A represents OR' the amides may be represented by the formula II
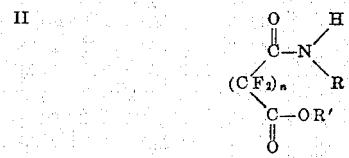

and when A represents

the amides may be represented by the formula

III
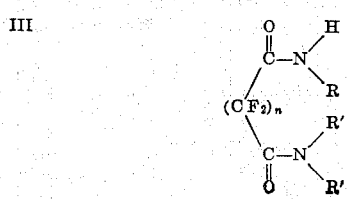

In each of Formulas II and III R and R' each represents a number of the class consisting of hydrogen and monovalent hydrocarbon radicals, and $n$ represents an integer which is at least 1. Thus, $n$ (Formulas I, II and III) may be, for example, from 1 to 8, inclusive. Preferably $n$ represents 2.

Illustrative examples of monovalent hydrocarbon radicals which R and R' in the above formulas may represent are: aliphatic (e. g., methyl, ethyl, propyl, isopropyl, butyl (n-butyl), sec.-butyl, tert.-butyl, amyl, isoamyl, hexyl, octyl, decyl, dodecyl, octadecyl, allyl, methallyl, crotyl, oleyl, etc.), including cycloaliphatic (e. g., cyclopentyl, cyclopentenyl, cyclohexyl, cyclohexenyl, cycloheptyl, etc.); aryl (e. g., phenyl, biphenylyl or xenyl, naphthyl, etc.); aliphatic-substituted aryl (e. g., tolyl, xylyl, ethylphenyl, propylphenyl, isopropylphenyl, tert.-butylphenyl, allylphenyl, 2-butenylphenyl, etc.); and aryl-substituted aliphatic (e. g., benzyl cinnamyl, phenylethyl, phenylpropyl, etc.). In Formula II R is preferably hydrogen and R' is either hydrogen or a saturated aliphatic monovalent hydrocarbon radical (e. g., methyl, ethyl, propyl, butyl, decyl, etc.); while in Formula III R and R' each preferably is hydrogen. Thus, in Formula III when $n$ is 1 and R and R' each represents hydrogen, the compound is difluoromalonamide (the diamide of difluoromalonic acid), the formula for which is IV
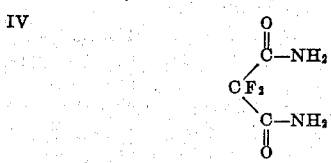

and when $n$ is 2, the compound is tetrafluorosuccinamide (the diamide of tretrafluorosuccinic acid), the formula for which is V
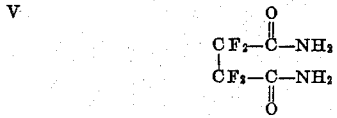

The names of other compounds of Formula III when R and R' each represents hydrogen and $n$ has other values are, for example, hexafluoroglutaramide $(n=3)$, octafluoroadipamide $(n=4)$, decafluoropimelamide $(n=5)$, dodecafluorosuberamide $(n=6)$, tetradecafluoroazelamide $(n=7)$, hexadecafluorosebacamide $(n=8)$, etc.

From the above formulas and definitions of R and R' it will be seen that the aldehyde-reactable compounds which are used in carrying the present invention into effect are both mono-amides and diamides of saturated aliphatic perfluorodicarboxylic acids, which amides have at least one hydrogen atom attached to a nitrogen atom thereof. Other and more specific examples of amides that may be used in practicing our invention, all of which are embraced by Formula I, are listed below:

Difluoromalonamic acid (monoamide of difluoromalonic acid)
Tetrafluorosuccinamic acid (monoamide of tetrafluorosuccinic acid)
Hexafluoroglutaramic acid
Octafluoroadipamic acid
Decafluoropimelamic acid
Dodecafluorosuberamic acid
Tetradecafluoroazelamic acid
Hexadecafluorosebacamic acid
N - methyldifluoromalonamic acid (N - methyl monoamide of difluoromalonic acid)
N - ethyltetrafluorosuccinamic acid (N - ethyl monoamide of tetrafluorosuccinic acid)
N-allylhexafluoroglutaramic acid
N-phenyloctafluoroadipamic acid
N-tolyldecafluoropimelamic acid
N-benzyldodecafluorosuberamic acid
Sym.-dimethyldifluoromalonamide
Sym.-diethyltetrafluorosuccinamide
N,N',N'-tripropyloctafluoroadipamide
As.-dibutyldodecafluorosuberamide
As.-diphenyltetradecafluoroazelamide
Sym.-diallyltetrafluorosuccinamide
As.-dibenzylhexafluoroglutaramide
Sym.-dicyclohexyloctafluoroadipamide
Sym.-dioctylhexadecafluorosebacamide
As.-dimethyltetrafluorosuccinamide
Methyl difluoromalonamate (methyl amidodifluoromalonate)
Ethyl tetrafluorosuccinamate
Propyl hexafluoroglutaramate
Butyl octafluoroadipamate
Methyl N-methyltetrafluorosuccinamate
Ethyl N-methyldifluoromalonamate
Octyl difluoromalonamate
Dodecyltetrafluorosuccinamate
Tetrafluorosuccinanilic acid
Sym.-di-n-butyltetrafluorosuccinamide
Sym.-dioctadecyltetrafluorosuccinamide
Tetrafluorosuccinanilide
Ethyl N-n-butyltetrafluorosuccinamate Reference is made to our copending application Serial No. 731,422, filed concurrently herewith, now Patent No. 2,502,478, issued April 4, 1950, for additional examples of compounds that may be employed. In that application are more fully described (including methods of preparation) and are claimed chemical compounds represented by the general formula VI
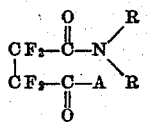

where R represents a member of the class consisting of hydrogen and monovalent hydrocarbon radicals and A represents one of the following:

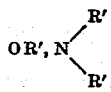

where R' has the same meaning as R. Monoamides of tetrafluorosuccinic acid, that is, tetrafluorosuccinamic acids, are prepared, for example, by effecting reaction, more particularly at a temperature not exceeding substantially 200° C., between tetrafluorosuccinic anhydride and ammonia or a primary or secondary amine. Compounds represented by the general formula VII
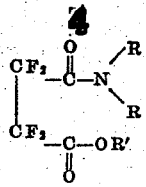

where R represents either hydrogen or a monovalent hydrocarbon radical and R' represents a monovalent hydrocarbon radical are prepared, for instance, by effecting reaction, more particularly at a temperature not exceeding substantially 200° C., between approximately equal molar proportions of (1) a compound represented by the general formula VIII
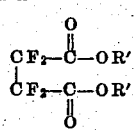

where R' represents a monovalent hydrocarbon radical and (2) a compound represented by the general formula IX

where R represents hydrogen or a monovalent hydrocarbon radical. Compounds represented by the general formula X
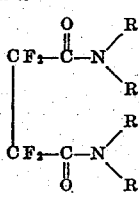

where R represents hydrogen or a monovalent hydrocarbon radical are prepared, for example, by effecting reaction, more particularly at a temperature not exceeding substantially 200° C., between (1) a compound of the kind represented by Formula VIII and wherein R' preferably represents a lower alkyl radical and (2) a compound of the kind represented by Formula IX, the reactants of (1) and (2) being employed in a molar ratio corresponding to at least two mols of the compound of (2) per mol of the compound of (1). Reference is made to our aforementioned copending application for more detailed information concerning the preparation of compounds of the kind embraced by Formula VI, some of which are embraced by Formula I. In a manner similar to that broadly described above and in detail in our above-identified copending application with particular reference to compounds such as are covered by Formula VI, other amides of saturated aliphatic perfluorodicarboxylic acids embraced by Formula I may be prepared.

It is an object of the present invention to provide a new class of synthetic materials, more particularly resinous compositions, which have particular utility in the plastics, coating and textile-finishing arts, e. g., as coating, laminating, adhesive, impregnating, textile-finishing, casting, and molding compositions, or as components of such compositions, as well as in other applications.

Another object of the present invention is to provide resinous compositions of the thermoplastic and thermosetting or potentially thermosetting types, which compositions have good flameproofing characteristics and are adapted to impart flame resistance to inflammable materials coated or otherwise associated therewith.

Another object of the invention is to provide fluorine-containing reaction products which may be used as modifiers of other resinous compositions to improve the properties of the latter.

Another object of the invention is to provide methods for preparing the new synthetic compositions of this invention.

Other objects of the invention will be apparent to those skilled in the art from the following more detailed description.

These and other objects are accomplished as broadly described in the first paragraph of this specification and more fully hereafter.

The present invention is based on our discovery that new and valuable materials having particular utility in the plastics, coating and other arts can be produced by effecting reaction between ingredients comprising an aldehyde and an amide of a saturated aliphatic perfluorodicarboxylic acid, which amide has at least one hydrogen atom attached to an amide nitrogen atom thereof, for instance, an N,N'-unsubstituted diamide of a saturated aliphatic perfluorodicarboxylic acid, e. g., tetrafluorosuccinamide, and others such as mentioned hereinbefore and in our aforementioned copending application by way of illustration. The high fluorine content of the fluorinated amides used in practicing our invention imparts heat-, flame- and chemical-resisting characteristics to resinous reaction products thereof with an aldehyde, e. g., formaldehyde, while the reactive amide grouping not only further aids in this same respect due to the nitrogen thereof but also makes possible the production of a reaction product which is readily workable and adapted for fields of utility for which the fluorinated amides per se would be entirely unsuited. This ease of workability is in marked contrast to many of the highly fluorinated resinous materials (e. g., polymeric tetrafluoroethylene) now being used or which have been suggested for use in the plastics and coating arts. The present invention therefore provides a resinous composition which readily can be molded or otherwise fabricated into useful articles of manufacture, without material sacrifice of the good electrical, chemical and flame-resisting characteristics imparted thereto by reason of its relatively high percentage of fluorine. Other improved properties, including high resistance to heat, abrasion, moisture, acids, and organic solvents of the thermoset or cured resins of this invention make them suitable for use in fields of utility, for instance, in electrically insulating and coating applications, for which resinous materials of lesser resistance to heat, water, abrasion, acids, and organic solvents, for example those obtained by reaction of an aldehyde, e. g., formaldehyde, with an amide of a non-halogenated saturated aliphatic dicarboxylic acid, e. g., malonic diamide, succinic diamide, etc., would be wholly unsuited.

In practicing our invention the initial reaction between the reactants may be carried out at normal or at elevated temperatures, at atmospheric, subatmospheric or superatmospheric pressures, and under neutral, alkaline or acid conditions. Any substance yielding an alkaline or an acid aqueous solution may be used in obtaining alkaline or acid conditions for the initial reaction. For example, we may use an alkaline substance such as sodium, potassium or calcium hydroxide, sodium or potassium carbonate, a mono-, di- or triamine, aqueous ammonia, etc. Illustrative examples of acid condensation catalysts that may be employed are inorganic and organic acids, e. g., hydrochloric, sulfuric, phosphoric, acetic, lactic, acrylic, phthalic, maleic, etc., or acid salts such as sodium acid sulfate, monosodium phosphate, etc. Mixtures of acids, of acid salts or of acids and acid salts may be employed if desired.

The reaction between the aldehyde and the fluorinated amide may be effected in the presence of solvents or diluents, other natural or synthetic bodies (numerous examples of which hereafter are given), or while admixed with other materials which are reactable or non-reactable with the aldehydic reactant or with the amide, for instance, methyl ethyl ketone, cyanamide, dicyandiamide, terephthalic diamide, acetamide, chlorinated acetamides, urea, thiourea, mono- and dimethylol ureas and thioureas, methyl urea, acetyl urea, allyl urea, phenyl urea and thiourea, guanyl urea, diethyl urea, dimethyl thiourea, dibenzyl thiourea, etc.; aminotriazines, e. g., melamine, ammeline, ammelide, melem, melam, 2,4,6-triethyl- and triphenyltriamino-1,3,5-triazines, 2-alloxy-4,6-diamino-1,3,5-triazine, 2-amino-4,6-dialloxy-1,3,5-triazine, etc., phenol and substituted phenols, e. g., the cresols, the xylenols, the tertiary-alkyl phenols, etc.; monohydric and polyhydric alcohols, e. g., butyl alcohol, amyl alcohol, heptyl alcohol, n-octyl alcohol, 2-ethylhexyl alcohol, ethylene glycol, propylene glycol, glycerine, polyvinyl alcohol, polyallyl alcohol, etc.; amines, including propylamine, dibutylamine, aniline, etc.; cyanuric triesters, for instance, cyanuric triesters of a primary, ethylenically unsaturated monohydric alcohol containing at least 3 and not more than 10 carbon atoms, e. g., triallyl cyanurate, trimethallyl cyanurate, etc.; and the like.

The modifying reactants may be incorporated with the amide and the aldehyde to form an intercondensation product by mixing all the reactants and effecting condensation therebetween under acid, alkaline or neutral conditions, or by various permutations of reactants. For example, we may effect partial reaction or condensation between the chosen aldehyde and the fluorinated amide, e. g., tetrafluorosuccinamide, octyl tetrafluorosuccinamate, etc., under acid, alkaline or neutral conditions; then add the modifying reactant, e. g., urea, melamine, n-butanol, etc., and effect further condensation under acid, alkaline or neutral conditions. Or, we may first partially react urea, melamine or other aldehyde-reactable modifying reactant with a molecular excess of an aldehyde under acid, alkaline or neutral conditions, then add the fluorinated amide and effect further condensation under the same or different conditions of acidity or alkalinity. Or, we may separately partially react (1) urea, melamine or other aldehyde-reactable modifying reactant and an aldehyde and (2) a fluorinated amide and an aldehyde, thereafter mixing the two products of partial reaction and effecting further reaction or condensation therebetween. The reactants of (1) and (2) may be partially condensed under acid, alkaline or neutral conditions. A method which is particularly applicable in preparing the new synthetic compositions of this invention comprises effecting reaction between ingredients comprising an aldehyde, e. g., formaldehyde, and an amide of a saturated aliphatic perfluorodicarboxylic acid, e. g., tetrafluorosuccinamide, a monoester monoamide of tetrafluorosuccinic acid, which amide has at least one hydrogen atom attached to an amide nitrogen atom, etc., the reaction between the said ingredients being initiated at a pH above 7.0, e. g., at a pH of 7.5 to 9.5 or 10, and being completed at a pH below 7.0, e. g., at a pH of 1 or 2 to 6.5.

In producing our new products, the choice of the aldehyde is dependent largely upon economic considerations and the particular properties desired in the finished product. We prefer to use as the aldehydic reactant formaldehyde or compounds engendering formaldehyde, e. g., paraformaldehyde, hexamethylenetetramine, trioxane, etc. Illustrative examples of other aldehydes that may be employed are acetaldehyde, propionaldehyde, butyraldehyde, heptaldehyde, octaldehyde, acrolein, methacrolein, crotonaldehyde, benzaldehyde, furfural, glyoxal, hydroxyaldehydes (e. g., aldol, glucose, glycollic aldehyde, glyceraldehyde, etc.), mixtures thereof, or mixtures of formaldehyde (or compounds engendering formaldehyde) with such aldehydes. Illustrative examples of aldehyde-addition products that may be used instead of the aldehydes themselves are the mono- and poly-(N-carbinol) derivatives, more particularly the mono- and polymethylol derivatives, of urea, thiourea, iminourea, and of substituted ureas, thioureas and iminoureas, mono- and poly-(N-carbinol) derivatives of amides of polycarboxylic acids, e. g., itaconic, fumaric, adipic, malonic, succinic, citric, phthalic, etc., mono- and poly-(N-carbinol) derivatives of the aminotriazines, of the aminotriazoles, of the aminodiazines, etc. Good results are obtained with aldehyde-addition products such as a methylol urea, more particularly mono- and dimethylol ureas, and a methylol melamine, e. g., di-, tri-, tetra-, penta- and hexamethylol melamines. Mixtures of aldehydes and aldehyde-addition products may be employed, e. g., mixtures of formaldehyde and methylol compounds such, for instance, as dimethylol urea, trimethylol melamine, hexamethylol melamine, etc.

The ratio of the aldehydic reactant to the fluorinated amide may be varied over a wide range depending, for example, upon the number of aldehyde-reactable amido groups in the fluorinated amide and upon the particular properties desired in the finished product. Ordinarily these reactants are employed in an amount corresponding to from about ¾ to about 10 or 11 mols of the aldehyde, specifically formaldehyde, for each mol of the fluorinated amide. Good results are obtained when the aldehyde is used in an amount corresponding to from about 1 to about 2 mols thereof for each aldehyde-reactable amido grouping in the fluorinated amide. When the aldehyde is available for reaction in the form of an alkylol derivative, more particularly a methylol derivative, e. g., dimethylol urea, trimethylol melamine, etc., amounts of such alkylol derivatives corresponding to or higher (e. g., from a few per cent more to 15 or 20 times as much) than the relative amounts mentioned above with reference to the aldehyde may be employed.

Some of the condensation products of this invention are thermoplastic materials even at an advanced stage of condensation, e. g., when certain aldehydes or modifiers are used or when the fluorinated amide reactant contains only a single aldehyde-reactable amide grouping, while others are thermosetting or potentially thermosetting bodies that convert under heat or under heat and pressure to a substantially insoluble, substantially infusible state. The thermoplastic products are of particular value as plasticizers for other synthetic resins that have unsatisfactory plasticity or flow characteristics. The thermosetting or potentially thermosetting resinous materials, alone or admixed with fillers, pigments, dyes, plasticizers, lubricants, curing agents, etc., may be used, for example, in the production of molding compositions. The liquid intermedate reaction products of this invention may be concentrated or diluted further by the removal or addition of volatile solvents to form, for example, liquid coating, laminating and adhesive compositions of adjusted viscosity and concentration. The heat-convertible or potentially heat-convertible reaction products may be used in liquid state, for instance, in the production of surface-coating materials such, for example, as paints, varnishes, lacquers, enamels, etc., for general adhesive applications, in producing laminated articles and for numerous other purposes. The liquid heat-hardenable or potentially heat-hardenable reaction products also may be used directly as casting resins, while those which are of a gel-like nature in partially reacted state may be dried and granulated to form clear, unfilled, heat-convertible resins.

In order that those skilled in the art better may understand how the present invention may be carried into effect, the following examples are given by way of illustration and not by way of limitation. All parts are by weight.

*Example 1*

This example illustrates the preparation of a reaction product of formaldehyde and tetrafluorosuccinamide, which reaction product contains a methylol grouping, and more particularly dimethylol tetrafluorosuccinamide, which may be represented by the formula XI 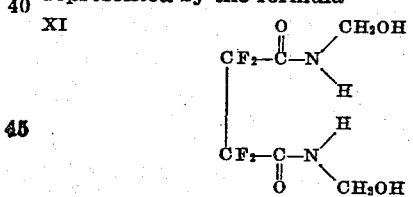

|  | Parts | Approx. Molar Ratio |
|---|---|---|
| Tetrafluorosuccinamide | 376 | 1.0 |
| Aqueous formaldehyde (approx. 37% HCHO) | 365 | 2.25 |
| Water | 350 | | are mixed together, yielding a fairly thin slurry to which is then added a 10% aqueous solution of potassium carbonate until the pH of the slurry is between 9 and 9.5. There is a noticeable evolution of heat and additional solid separates. The mixture is then heated on a steam bath, yielding a clear solution after 7 minutes. After heating for an additional 23 minutes, more potassium carbonate solution is added so as to maintain the reaction mass approximately neutral or slightly alkaline. Heating is then continued for an additional 45 minutes. The reaction mass is cooled in an ice bath and the white precipitate comprising crude dimethylol tetrafluorosuccinamide is filtered off and washed with a small amount of water. The wet cake is dried under vacuum over calcium chloride. The yield of dried dimethylol tetrafluorosuccinamide is 305 parts, which corresponds to 61.5% of the theoretical.

A sample of dimethylol tetrafluorosuccinamide which had been recrystallized from water melted at 154°–158° C. with decomposition, and gave the following results upon analysis:

|  | Per Cent C | Per Cent H |
|---|---|---|
| Calculated for $C_6H_8F_4N_2O_4$ | 29.03 | 3.25 |
| Found | 28.96 | 3.49 |
|  | 28.90 | 3.58 |

Tetrafluorosuccinamide is prepared, for example, as follows: Anhydrous ammonia is bubbled through a solution of 100 parts of diethyl tetrafluorosuccinamide dissolved in about 264 parts of benzene. A solid comprising tetrafluorosuccinamide precipitates slowy at first and more rapidly as the temperature rises from 26° C. to 43° C. at which point the reaction vessel is externally cooled to reduce the temperature of the contents to about 30° C. The reaction is complete in about 3 hours. The precipitated solid is filtered off, washed twice with benzene and dried at room temperature.

*Example 2*

Cotton cloth is immersed in a warm (120° F.) aqueous solution containing 10% by weight of dimethylol tetrafluorosuccinamide and 0.35%, by weight of the said amide, of diammonium phosphate as a curing catalyst. The excess liquid is squeezed out and the impregnated cloth is then heated for 6 minutes at 290° F. to evaporate the water and to resinify the dimethylol tetrafluorosuccinamide. The dried cloth contains about 8% by weight of resin solids, based on the weight of the untreated cloth. The treated cloth is more flame resistant, that is, it supports combustion less readily, than the untreated cloth.

*Example 3*

Same as Example 2 with the exception that 0.35%, by weight of the amide, of methyl acid pyrophosphate is used as a curing catalyst and the impregnated cloth is heated for 6 minutes at 360° F. The amount of resin in the dried cloth is approximately the same as in Example 2. The treated cloth supports combustion less readily than the untreated cloth.

*Example 4*

|  | Parts | Approx. Molar Ratio |
|---|---|---|
| Tetrafluorosuccinamide | 94 | 0.5 |
| Melamine | 63 | 0.5 |
| Aqueous formaldehyde (approx. 37% HCHO) | 178 | 2.2 | are mixed together, yielding a slurry having a pH of about 5, to which is added a sufficient amount of 10% aqueous potassium carbonate solution to give the mass a pH of about 7.5–8. Upon heating the alkaline reaction mass in an oil bath maintained at 125° C. for about 5 minutes the solids dissolve, an exothermic reaction takes place, and a white resinous material which is hard and somewhat brittle when cold is obtained.

*Example 5*

|  | Parts | Approx. Molar Ratio |
|---|---|---|
| Urea | 60.0 | 1.0 |
| Aqueous formaldehyde (approx. 37% HCHO) | 178.0 | 2.2 |
| Tetrafluorosuccinamide | 18.8 | 0.1 |

The urea and aqueous formaldehyde are mixed together and a sufficient amount of 10% aqueous NaOH solution is added thereto to give the reaction mixture a pH of about 8.5. The alkaline mixture is heated under reflux at the boiling temperature of the mass for 15 minutes. The above-stated amount of tetrafluorosuccinamide is now added, and heating under reflux is continued for an additional 5 minutes to cause the tetrafluorosuccinamide to intercondense with the urea-formaldehyde partial reaction product. The resulting resinous syrup is potentially heat-curable, as evidenced by the fact that when a small amount of a curing agent is incorporated into samples thereof, e. g., about 1% by weight thereof of phthalic anhydride, chloroacetamide, sulfamic acid, maleic acid, maleic anhydride, chloroacetyl urea, melamine pyrophosphate, etc., and the resulting syrup (pH of about 3–4) is heated on a 140° C. hot plate, it cures to a substantially insoluble, substantially infusible state.

The resinous syrup of this example may be used in the production of molding (moldable) compounds, e. g., by mixing with alpha-cellulose, a small amount of a mold lubricant, e. g., zinc stearate, and a curing agent, e. g., ammonium sulfamate, diammonium phosphate, melamine pyrophosphate, tetrafluorosuccinamic acid, etc., and drying the resulting compound at 60° C. until sufficient moisture has been removed so that the composition can be molded satisfactorily.

*Example 6*

|  | Parts | Approx. Molar Ratio |
|---|---|---|
| Tetrafluorosuccinamide | 56.4 | 1.0 |
| Furfural | 116.0 | 4.0 |
| Glacial acetic acid | 5.2 |  | yield a black, resinous material upon heating the mixed ingredients at 140° C. for about 5–10 minutes under a carbon dioxide atmosphere.

*Example 7*

|  | Parts | Approx. Molar Ratio |
|---|---|---|
| Phenol | 94.0 | 1.0 |
| Aqueous formaldehyde (approx. 37% HCHO) | 178.0 | 2.2 |
| Tetrafluorosuccinamide | 18.8 | 0.1 |
| Sodium hydroxide (in 15 parts of water) | 0.6 |  |

All of the above ingredients with the exception of the tetrafluorosuccinamide are heated together under reflux at the boiling temperature of the mass for 45 minutes. The tetrafluorosuccinamide is now added and refluxing is continued for an additional 5 minutes to cause the tetrafluorosuccinamide to intercondense with the phenol-formaldehyde partial reaction product. The resulting resinous syrup is made slightly acid with a dilute aqueous solution of lactic acid, after which it is dehydrated under reduced pressure to an internal temperature of about 80° C. The dehydrated resin is cast into molds and cured therein at about 80° C. until a hard, well-cured resin has been obtained, usually for from about 1 or 2 days up to 7 or 8 days.

Example 8

|  | Parts | Approx. Molar Ratio |
| --- | --- | --- |
| Tetrafluorosuccinamide | 56.4 | 1.0 |
| Aqueous glyoxal (approx. 30.8% C₂H₂O₂) | 85.0 | 1.5 | are mixed together and sufficient 10% aqueous potassium carbonate added thereto to give the reaction mixture a pH of about 9.0. The alkaline mixture is heated at 85° C. for 5 hours. After standing at room temperature for about 64 hours, a small amount of solid is filtered from the reaction mass, and the filtrate is evaporated at 100° C. to yield a sticky, black resin.

Example 9

|  | Parts | Approx. Molar Ratio |
| --- | --- | --- |
| Tetrafluorosuccinamide | 37.6 | 1.0 |
| Glycerine | 18.4 | 1.0 |
| Aqueous formaldehyde (approx. 37% HCHO) | 56.7 | 3.5 | are mixed and adjusted to a pH of about 8.0 by adding a 10% aqueous solution of sodium hydroxide. The alkaline mixture is heated under reflux at the boiling temperature of the mass for 10 minutes, yielding a viscous solution of a partially resinified mass. The solution is dehydrated to obtain a resinous syrup which is potentially heat-curable. When a small amount of a curing agent such as mentioned under Example 5 is incorporated into the initial viscous solution or into the dehydrated syrup, the material cures to a substantially insoluble, substantially infusible state upon heating on a 140° C. hot plate. The resinous composition of this example may be used in the preparation of liquid coating and impregnating compositions.

Example 10

|  | Parts | Approx. Molar Ratio |
| --- | --- | --- |
| Tetrafluorosuccinamide | 18.8 | 1.0 |
| Acetaldehyde | 47.0 | 10.7 |
| Water | 100.0 | |

The above ingredients are mixed together and thereafter cooled in an ice bath. After adding a sufficient amount of a 10% aqueous potassium carbonate solution to impart to the mass a pH of about 9.0, it is heated under reflux at boiling temperature for 2½ hours. Considerable color develops during the heating. After standing at room temperature for about 64 hours, the reaction mass is filtered. The filtrate is heated to evaporate the unreacted acetaldehyde and water, yielding a viscous, tacky resin.

Example 11

|  | Parts | Approx. Molar Ratio |
| --- | --- | --- |
| Tetrafluorosuccinamide | 18.8 | 1.0 |
| Propionaldehyde | 40.0 | 6.9 |
| Glacial acetic acid | 5.2 | | are heated together under reflux at the boiling temperature of the mass for about 16 hours. The resulting reaction mass is filtered, and the filtrate is heated to evaporate unreacted propionaldehyde. A dark brown, viscous, tacky resin is obtained.

Example 12

|  | Parts | Approx. Molar Ratio |
| --- | --- | --- |
| Tetrafluorosuccinamide | 37.6 | 1.0 |
| Benzaldehyde | 52.5 | 2.5 |
| Glacial acetic acid | 5.2 | |

The above ingredients are heated at 160° C. under reflux for 3 hours, with occasional shaking, in a 2-necked reaction vessel provided with a gas-inlet tube and a reflux condenser. A slow stream of carbon dioxide is passed over the surface of the mass during the reaction period. A yellow, viscous liquid which is insoluble in petroleum ether, benzene and chloroform but soluble in 95% ethanol is obtained, from which unreacted benzaldehyde is removed by extraction with hot benzene.

If desired, the yellow, viscous liquid may be dissolved in hot ethanol, and benzene added to the resulting solution. Upon cooling, a white reaction product of benzaldehyde and tetrafluorosuccinamide precipitates, which product, after isolation and drying, is a white, fusible powder.

Example 13

|  | Parts | Approx. Molar Ratio |
| --- | --- | --- |
| Urea | 57.0 | 0.95 |
| Ethyl N-n-butyltetrafluorosuccinamate | 13.65 | 0.05 |
| Aqueous formaldehyde (approx. 37% HCHO) | 162.0 | 2.0 |
| Aqueous ammonia (approx. 28% NH₃) | 7.6 | |
| Sodium hydroxide in 10 parts of water | 0.04 | |

All of the above ingredients with the exception of the ethyl-N-n-butyltetrafluorosuccinamate are heated together under reflux at the boiling temperature of the mass for 30 minutes. The fluorinated compound is now added and heating under reflux is continued for an additional 10 minutes to cause it to intercondense with the urea-formaldehyde partial reaction product. A molding (moldable) composition is made from the resulting resinous syrup by mixing therewith 75 parts alpha-cellulose, 0.4 part of a mold lubricant, specifically zinc stearate, and 2 parts of a curing agent, specifically phthalic anhydride. The wet molding compound is dried at 60° C. until sufficient moisture has been removed to provide a composition that can be molded satisfactorily. A well-cured molded article which shows good plastic flow during molding is obtained by molding a sample of the dried and ground molding compound for 5 minutes at 130° C. under a pressure of 2000 pounds per square inch.

Ethyl N-n-butyltetrafluorosuccinamate is prepared, for example, as follows: A solution of 24.6 parts of diethyl tetrafluorosuccinate dissolved in about 88 parts of benzene is added slowly to 7.3 parts of n-butylamine. A solid precipitates from the clear solution after standing for a few minutes. After standing for about 16 hours at room temperature, 5 parts of N,N'-di-n-butyltetrafluorosuccinamide is removed by filtration. The filtrate is evaporated under reduced pressure to yield a solid residue comprising ethyl-N-n-butyltetrafluorosuccinamate.

Example 14

|  | Parts | Approx. Molar Ratio |
|---|---|---|
| Melamine | 113.4 | 0.9 |
| Ethyl N-n-butyltetrafluorosuccinamate | 27.3 | 0.1 |
| Aqueous formaldehyde (approx. 37% HCHO) | 284.0 | 3.5 |
| Sodium hydroxide in 10 parts of water | 0.12 | |
| Aqueous ammonia (approx. 28% NH₃) | 6.0 | |

All of the above ingredients with the exception of the ethyl N-n-butyltetrafluorosuccinamate are heated together under reflux at boiling temperature for 15 minutes. The fluorinated compound is now added and heating under reflux is continued for an additional 5 minutes to cause it to intercondense with the melamine-formaldehyde partial reaction product. A molding compound is made from the resulting resinous syrup by mixing therewith 130 parts alpha-cellulose, 0.8 part zinc stearate and 0.6 part citric acid as a curing agent. The wet molding composition is dried at 65° C. until sufficient moisture has been removed to provide a compound that can be molded satisfactorily. A well-cured molded article which shows good plastic flow during molding is obtained by molding a sample of the dried and ground molding composition for 5 minutes at 130° C. under a pressure of 2000 pounds per square inch.

Example 15

|  | Parts | Approx. Molar Ratio |
|---|---|---|
| Urea | 15.0 | 1.0 |
| Melamine | 31.5 | 1.0 |
| Aqueous formaldehyde (approx. 37% HCHO) | 101.5 | 5.0 |
| Aqueous ammonia (approx. 28% NH₃) | 3.0 | |
| Sodium hydroxide in 4 parts of water | 0.06 | |
| Tetrafluorosuccinanilic acid | 6.7 | 0.1 |

All of the above ingredients with the exception of the tetrafluorosuccinanilic acid are heated together under reflux at the boiling temperature of the mass for 15 minutes. The tetrafluorosuccinanilic acid is now added and heating under reflux is continued for an additional 5 minutes to cause it to intercondense with the urea-melamine-formaldehyde partial reaction product. The hot, thermosetting, resinous syrup is mixed with 48 parts of alpha-cellulose and 0.4 part zinc stearate to form a molding compound. The wet molding composition is dried at 60° C. until sufficient moisture has been removed to provide a compound that can be molded satisfactorily. A sample of the dried and ground molding compound is molded for 3 minutes at 130° C. under a pressure of 2000 pounds per square inch, yielding a well-cured molded article of good appearance and which shows good plastic flow during molding.

In this example the tetrafluorosuccinanilic acid functions as an intercondensable curing agent or reactant to impart accelerated curing characteristics to the urea-melamine-formaldehyde partial reaction product.

Tetrafluorosuccinanilic acid is prepared, for example, as follows: To a solution of 12.3 parts of tetrafluorosuccinic anhydride dissolved in about 220 parts of dry benzene is added a solution of 6.7 parts of aniline dissolved in about 88 parts of dry benzene. Some heat is evolved, and after standing for about 2 minutes a white solid comprising tetrafluorosuccinanilic acid separates from the reaction mass. After standing at room temperature (20°–30° C.) for about 16 hours, the precipitated solid is filtered off, washed with benzene and dried.

Example 16

|  | Parts | Approx. Molar Ratio |
|---|---|---|
| Urea | 15.0 | 1.0 |
| Melamine | 31.5 | 1.0 |
| Tetrafluorosuccinamide | 9.4 | 0.2 |
| Aqueous formaldehyde (approx. 37% HCHO) | 111.7 | 5.5 |
| Aqueous ammonia (approx. 28% NH₃) | 3.3 | |
| Sodium hydroxide in 4 parts of water | 0.06 | |
| Tetrafluorosuccinanilic acid | 6.7 | 0.1 |

All of the above ingredients with the exception of the tetrafluorosuccinanilic acid are heated together under reflux at boiling temperature for 15 minutes, yielding a resinous syrup which is potentially heat-curable. The tetrafluorosuccinanilic acid is now added and heating under reflux is continued for an additional 5 minutes to cause it to intercondense with the urea melamine-tetrafluorosuccinamide-formaldehyde partial reaction product. The resulting thermosetting resinous syrup is converted to a substantially insoluble, substantially infusible state upon heating on a 140° C. hot plate. It may be used in the production of molding compounds having good plasticity during molding and accelerated curing characteristics as described under Example 15.

Example 17

|  | Parts | Approx. Molar Ratio |
|---|---|---|
| Melamine | 25.2 | 1 |
| Dimethylol tetrafluorosuccinamide | 49.6 | 1 |
| n-Butanol | 178.0 | 12 |
| Aqueous formaldehyde (approx. 37% HCHO) | 81.0 | 5 |

The melamine, formaldehyde and n-butanol are mixed together, yielding a mixture having a pH of about 4.5. The mixture is heated for 1 hour under reflux at the boiling temperature of the mass. The resulting liquid resin has a pH of about 5.0 The resinous syrup is cooled somewhat, and the above-stated amount of dimethylol tetrafluorosuccinamide is added thereto, yielding a mixture having a pH of about 4.5. To this mixture is added about 88 parts of benzene, and the resulting liquid mass is heated for approximately 2 hours under reflux in a reaction vessel fitted with a trap for the separation of water. At the end of this period dehydration is substantially complete. The mass is then distilled to remove the benzene and a portion of the unreacted butanol. A clear, almost colorless liquid resin, which is suitable for use in the preparation of liquid coating compositions, is obtained.

Instead of dimethylol tetrafluorosuccinamide in the above formula, an equivalent amount of monomethylol tetrafluorosuccinamide may be used.

It will be understood, of course, by those skilled in the art that our invention is not limited to the specific reactants nor to the specific conditions of reaction shown in the above illustrative examples. Thus, instead of formaldehyde, furfural, glyoxal, acetaldehyde, propionaldehyde or benzaldehyde, any other aldehyde or compound engendering an aldehyde, numerous examples of which have been given hereinbefore, may be employed. Also, we may use instead of the amides of a saturated aliphatic perfluorodicarboxylic acid specified in the various examples, any other such amides, more particularly amides such as are embraced by Formula I or mixtures thereof with each other or with any of the amides named in the examples. The reaction may be effected at temperatures ranging from room temperature to the fusion or boiling temperature of the mixed reactants, the reaction proceeding more slowly at normal temperature than at elevated temperatures in accordance with the general low of chemical reaction.

The curing of the thermosetting or potentially thermosetting resinous compositions of this invention may be accelerated by incorporating therein a curing agent (or mixture of curing agents), for instance, a direct or active curing catalyst (e. g., phthalic acid, phthalic anhydride, maleic acid, maleic anhydride, succinic acid, tartaric acid, citric acid, etc.), or a latent curing catalyst (e. g., an ammonium salt of phophoric acid, ammonium chloride, ammonium silicofluoride, ammonium borofluoride, benzoyl mercaptobenzothiazole, the ammonium salt of toluene sulfonic acid, phthaloyl mercapto-benzothiazole, benzoyl phthalimide, etc.). Catalysts which are capable of intercondensing with the partial reaction product may be employed, for instance, curing reactants such as glycine, sulfamic acid, chloroacetone, mono-, di-, or trichloroacetamides, chloroacetyl urea, etc. Monoamides of saturated aliphatic perfluorodicarboxylic acids may be used as intercondensable curing agents or reactants, if desired. Examples of such agents are difluoromalonamic acid, tetrafluorosuccinamic acid, tetrafluororsuccinanilic acid, N-methyldifluoromalonamic acid, N-ethyltetrafluorosuccinamic acid, hexafluoroglutaramic acid, N-butylhexafluoroglutaramic acid, octafluoroadipamic acid, etc. The amount of curing catalyst, if used, may be varied as desired or as conditions may require, but ordinarily is within the range of 0.1 to 5 or 6 per cent by weight of the neutral, thermosetting or potentially thermosetting resinous composition.

As indicated hereinbefore and as further shown by a number of the examples, the properties of the fundamental resins of this invention may be varied widely by introducing other modifying bodies before, during or after effecting condensation between the primary components. Thus as modifying agents we may use, for instance, monohydric alcohols, e. g., methyl, ethyl, propyl, butyl, hexyl, n-octyl, 2-ethylhexyl, decyl, dodecyl, cetyl, lauryl, capryl, or tetrahydrofurfuryl alcohol, pentanol or mixtures of isomeric pentanols (which mixtures also may include n-pentanol), cyclohexanol, methylcyclohexanol, etc.; polyhydric alcohols, e. g., glycerol, pentaerythritol, dipentaerythritol, trimethylol propane, mannitol, sorbitol, ethylene glycol, diethylene glycol, butylene glycol, neopentyl glycol, 2-butene-1,4-diol, 2-butyne-1,4-diol, 2-butyloctanediol-1,3, etc.; alcohol-ethers, e. g., ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, etc.; amides other than those used in practicing this invention, e. g., cyanamide, dicyandiamide, stearamide, acrylamide, benzamide, phthalamide, benzene sulfonamides, toluene sulfonamides, etc.; amines, e. g., ethylene diamine, phenylene diamine, triethylene tetramine, etc.; ketones, including halogenated ketones, e. g., methyl ethyl ketone, acetone, chloroacetones, etc.; nitriles, including halogenated nitriles, e. g., acrylonitrile, methacrylonitrile, acetronitrile, chloroacetonitriles, etc.; acylated ureas, including halogenated acylated ureas, e. g., acetyl urea, propionyl urea, chloroacetyl urea, etc.

Illustrative examples of other modifying bodies that may be incorporated into the resinous compositions of this invention are aminotriazinealdehyde condensation products, more particularly melamine-aldehyde condensation products (e. g., melamine-formaldehyde condensation products), urea-aldehyde condensation products (e. g., urea-formaldehyde condensation products), protein-aldehyde condensation products, aminodiazine-aldehyde condensation products, aminotriazole-aldehyde condensation products, aniline-aldehyde condensation products, phenol-aldehyde condensation products (e. g., phenol-formaldehyde condensation products), furfural condensation products, modified or unmodified, saturated or unsaturated polyhydric alcohol-polycarboxylic acid reaction products, ester gums, water-soluble cellulose derivatives, natural gums and resins such as shellac, rosin, etc., polyvinyl compounds such as polyvinyl alcohol, polyvinyl esters (e. g., polyvinyl acetate, polyvinyl butyrate, etc.), polyvinyl ethers, including polyvinyl acetals, e. g., polyvinyl formal, polyvinyl butyral, etc.

Coating compositions may be prepared from the thermosetting or potentially thermosetting resinous compositions of this invention alone or admixed with, for example, melamine-formaldehyde resins, urea-melamine-formaldehyde resins, fatty oil or fatty oil acid-modified alkyd resins, or other film-forming materials commonly used in protective-coating compositions. For example, a coating composition may be made containing, for instance, from 15 to 95 parts by weight of a thermosetting or potentially thermosetting resin of the kind with which this invention is concerned and from 85 to 5 parts of a fatty oil acid-modified alkyd resin, numerous examples of which are given, for example, in Moore Patent No. 2,218,474, issued October 15, 1940.

In the preparation of the coating compositions of this invention we prefer to interact ingredients comprising (1) an amide of a saturated aliphatic perfluorodicarboxylic acid, e. g., tetrafluorosuccinamide, (2) an aldehyde, specifically formaldehyde, and (3) a monohydric alcohol, more particularly a primary monohydric alcohol. An alkylation reaction takes place, and an ether corresponding to the alkyl or other monovalent hydrocarbon radical of the alcohol employed is formed. In such reactions we prefer to use n-butanol, but other primary monohydric alcohols may be employed, e. g., methanol, ethanol, n-propyl alcohol, isobutyl alcohol, etc.

Dyes, pigments, driers, curing agents, plasticizers, mold lubricants, opacifiers and various fillers (e. g., wood flour, glass fibers, asbestos, mineral wool, mica dust, powdered quartz, antimony oxide, titanium dioxide, zinc oxide, talc, china clay, carbon black, etc.) may be compounded by conventional practice with the resinous materials of our invention, as desired or as conditions may require, in order to provide a coating, molding or other composition best adapted to meet a particular service use. For additional and more detailed information concerning the modifying ingredients that may be employed in producing coating compositions from our new resins, reference is made to the aforementioned Moore patent.

The modified and unmodified resinous compositions of this invention have a wide variety of uses. For example, in addition to their use in the production of textile-finishing, coating and molding compositions, they may be employed as modifiers of other natural and synthetic resins. Thus, the thermoplastic resins may be used to improve the plasticity or flow characteristics, as well as the flame resistance, of thermosetting resins which have insufficient or unsatisfactory plasticity during curing to an insoluble, infusible state, e. g., certain urea-formaldehyde resins where better flow during molding is desirable. This improved plasticity permits molding at lower pressures. The soluble resins of this invention also may be dissolved in solvents, e. g., benzene, toluene, xylene, amyl acetate, methyl ethyl ketone, butanol, etc., and used as laminating varnishes in the production of laminated articles wherein sheet materials, e. g., paper, cloth, sheet asbestos, glass, cloth, etc., are coated or coated and impregnated with the resin solution, superimposed and thereafter united under heat and pressure. They also may be employed as an adhesive in making laminated plywood, as an impregnant of pulp preforms from which molded articles thereafter are made by subjecting the impregnated preform to heat and pressure, as impregnants for electric coils and for other electrically insulating applications, for bonding together abrasive grains in the production of resin-bonded abrasive articles such, for instance, as grindstones, sandpapers, etc., in the manufacture of electrical resistors, etc. They also may be used for treating textile materials (e. g., cotton, linen, rayon, and other cellulose-containing textiles, wool, silk and other natural or synthetic proteinaceous textiles, including nylon and textiles derived from casein, soyabeans, etc.), in filament, thread, yarn, fabric (woven or felted) or other form, in order to improve the properties of such textile materials, e. g., to improve the flame resistance, to increase the stiffness, to increase the service life, or otherwise to enhance the properties of the treated materials and to make them more useful or serviceable to the ultimate user.

We claim:

1. A composition comprising a synthetic material which is the product of reaction of ingredients comprising an aldehyde and an amide of a saturated aliphatic perfluorodicarboxylic acid, said amide having at least one hydrogen atom attached to a nitrogen atom thereof and being selected from the class of amides represented by the formulas

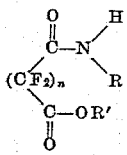

and

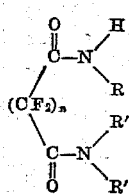

where R and R' each represents a member of the class consisting of hydrogen and monovalent hydrocarbon radicals, and $n$ represents a positive integer.

2. A composition comprising a synthetic material which is the product of reaction of ingredients comprising formaldehyde and an N,N'-unsubstituted diamide of a saturated aliphatic perfluorodicarboxylic acid represented by the formula

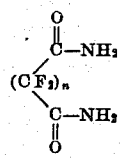

where $n$ represents a positive integer between 1 and 8, inclusive.

3. A composition comprising a synthetic material which is the product of reaction of ingredients comprising an aldehyde and tetrafluorosuccinamide.

4. A composition comprising a synthetic material which is the product of reaction of ingredients comprising formaldehyde and tetrafluorosuccinamide.

5. A reaction product of formaldehyde and tetrafluorosuccinamide, said reaction product having a methylol grouping attached directly to a nitrogen atom of the said tetrafluorosuccinamide.

6. Dimethylol tetrafluorosuccinamide.

7. A heat-curable resinous composition comprising a heat-convertible product obtained by effecting partial reaction between ingredients comprising formaldehyde and tetrafluorosuccinamide.

8. A product comprising the cured resinous composition of claim 7.

9. A composition comprising a resinous product of reaction of ingredients comprising (1) an aldehyde, (2) an alcohol and (3) an N,N'-unsubstituted diamide of a saturated aliphatic perfluorodicarboxylic acid represented by the formula

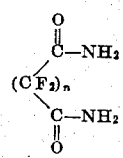

where $n$ represents a positive integer between 1 and 8, inclusive.

10. A resinous composition comprising the product of reaction of ingredients comprising (1) formaldehyde, (2) a monohydric alcohol and (3) tetrafluorosuccinamide.

11. A composition comprising a resinous product of reaction of ingredients comprising (1) an aldehyde, (2) an aminotriazine and (3) an N,N'-unsubstituted diamide of a saturated aliphatic perfluorodicarboxylic acid represented by the formula

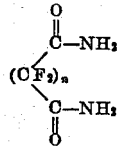

where $n$ represents a positive integer between 1 and 8, inclusive.

12. A resinous composition comprising the product of reaction of ingredients comprising (1)

formaldehyde, (2) melamine and (3) tetrafluorosuccinamide.

13. A composition comprising the resinous product of reaction of (1) a product of partial reaction of ingredients comprising formaldehyde, melamine and tetrafluorosuccinamide and (2) a curing agent comprising tetrafluorosuccinanilic acid.

14. A composition comprising a synthetic material which is the product of reaction of ingredients comprising (1) an aldehyde and (2) a monoamide of tetrafluorosuccinic acid, said reactant of (2) having at least one hydrogen atom attached to the amide nitrogen atom and being represented by the formula

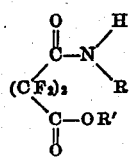

where R represents a member of the class consisting of hydrogen and monovalent hydrocarbon radicals and R' represents a monovalent hydrocarbon radical.

15. A composition as in claim 13 wherein the aldehyde is formaldehyde.

16. A melamine-formaldehyde resinous composition having intercondensed therein a monoester monoamide of tetrafluorosuccinic acid, said monoester monoamide having at least one hydrogen atom attached to the amide nitrogen atom and being represented by the formula

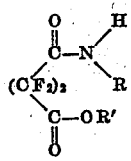

where R represents a member of the class consisting of hydrogen and monovalent hydrocarbon radicals and R' represents a monovalent hydrocarbon radical.

17. A textile-treating composition comprising an aqueous solution of dimethylol tetrafluorosuccinamide.

18. The method of preparing a new synthetic composition which comprises effecting reaction between ingredients comprising an aldehyde and an amide of a perfluorodicarboxylic acid, said amide having at least one hydrogen atom attached to an amide nitrogen atom and being selected from the class of amides represented by the formulas

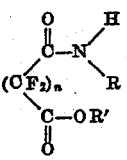

and

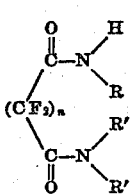

where R and R' each represents a member of the class consisting of hydrogen and monovalent hydrocarbon radicals, and n represents a positive integer.

19. The method of preparing a new synthetic composition which comprises effecting reaction between ingredients comprising formaldehyde and tetrafluorosuccinamide.

20. The method of preparing a new synthetic composition which comprises effecting reaction between ingredients comprising formaldehyde and tetrafluorosuccinamide, the reaction between the said ingredients being initiated at a pH above 7.0 and being completed at a pH below 7.0

21. The method of preparing dimethylol tetrafluorosuccinamide which comprises forming an aqueous slurry of tetrafluorosuccinamide and an aqueous solution of formaldehyde in the ratio of 1 mol of the former to more than 2 mols of the latter, rendering the said slurry alkaline to an extent such that its pH is between 9 and 9.5, heating the resulting slurry until a clear solution has formed and thereafter, under non-acidic conditions, for a period sufficient to form dimethylol tetrafluorosuccinamide, and isolating dimethylol tetrafluorosuccinamide from the resulting reaction mass.

22. The method of preparing dimethylol tetrafluorosuccinamide which comprises mixing together 376 parts of tetrafluorosuccinamide, 365 parts of aqueous formaldehyde containing approximately 37% HCHO, and 350 parts of water thereby to obtain a fairly thin slurry, adding to this slurry a 10% aqueous solution of potassium carbonate until the pH of the slurry is between 9 and 9.5, heating the resulting mixture for a period of the order of 30 minutes to produce a clear solution, adding an additional amount of a 10% aqueous solution of potassium carbonate to the clear solution so as to maintain the reaction mass approximately neutral, heating the resulting mass for an additional period of the order of 45 minutes, thereafter cooling the reaction mass, filtering off the resulting precipitate comprising crude dimethylol tetrafluorosuccinamide from the cooled mass, washing the said dimethylol tetrafluorosuccinamide with water and drying the resulting wet cake of dimethylol tetrafluorosuccinamide under vacuum thereby to obtain dimethylol tetrafluorosuccinamide in dry state.

EDWARD L. KROPA.
JOHN J. PADBURY.

REFERENCES CITED

The following references are of record in the file of this patent:

UNITED STATES PATENTS

| Number | Name | Date |
|---|---|---|
| 2,239,440 | D'Alelio | Apr. 22, 1941 |
| 2,270,520 | Graenacher et al. | Jan. 20, 1942 |
| 2,351,602 | D'Alelio | June 20, 1944 |
| 2,426,224 | Kharasch | Aug. 26, 1947 |

OTHER REFERENCES

Abstracts of Papers, 110th Meeting American Chemical Society, Sept. 9–13, 1946, page 441.

Gilman: Jour. Amer. Chem. Soc., vol. 65, pages 1458–1460, Aug. 1943.

Henne: Jour. Amer. Chem. Soc., vol. 67, pages 1235–1237, Aug. 1945.

McBee: Ind. and Eng. Chem., vol. 39, pages 415–417, March 1947.

Certificate of Correction

Patent No. 2,523,470 September 26, 1950

EDWARD L. KROPA ET AL.

It is hereby certified that error appears in the printed specification of the above numbered patent requiring correction as follows:

Column 2, line 21, after the word "benzyl" insert a comma; column 8, line 9, for "intermedate" read *intermediate*; column 14, line 24, for "urea melamine" read *urea-melamine*; column 15, line 11, for "low" read *law*; line 21, for "phophoric" read *phosphoric*; column 16, line 4, for "acetronitrile" read *acetonitrile*; column 17, line 23, after the word "glass" strike out the comma; line 31, for "electric" read *electrical*;

and that the said Letters Patent should be read as corrected above, so that the same may conform to the record of the case in the Patent Office.

Signed and sealed this 19th day of December, A. D. 1950.

[SEAL]

THOMAS F. MURPHY,
*Assistant Commissioner of Patents.*